Feb. 4, 1947.  R. A. C. BRIE  2,415,071
LANDING AND LAUNCHING MEANS FOR AIRCRAFT
Filed Sept. 9, 1942  4 Sheets-Sheet 1

Inventor
Reginald A. C. Brie.
By Loyd Hall Sutton.
Attorney

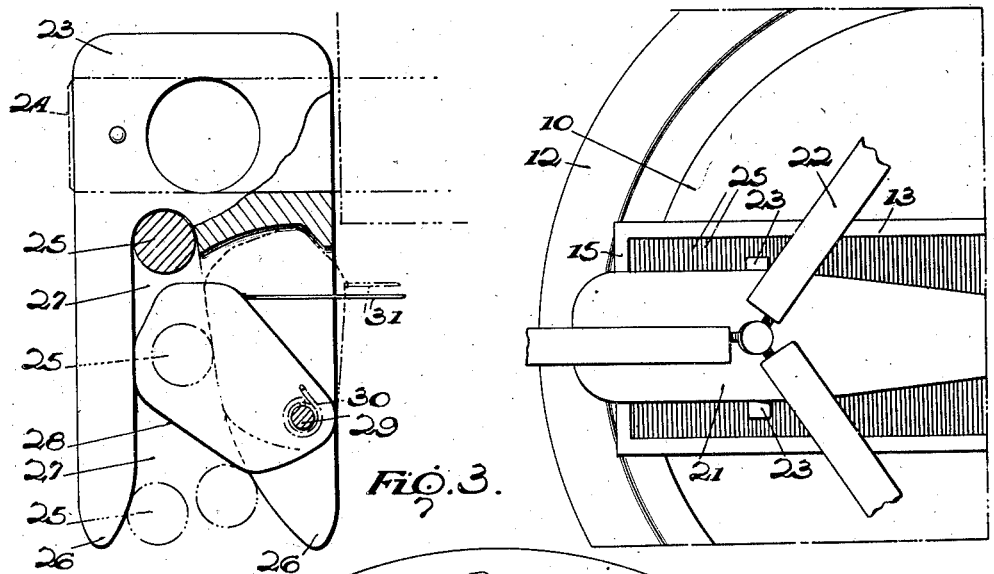
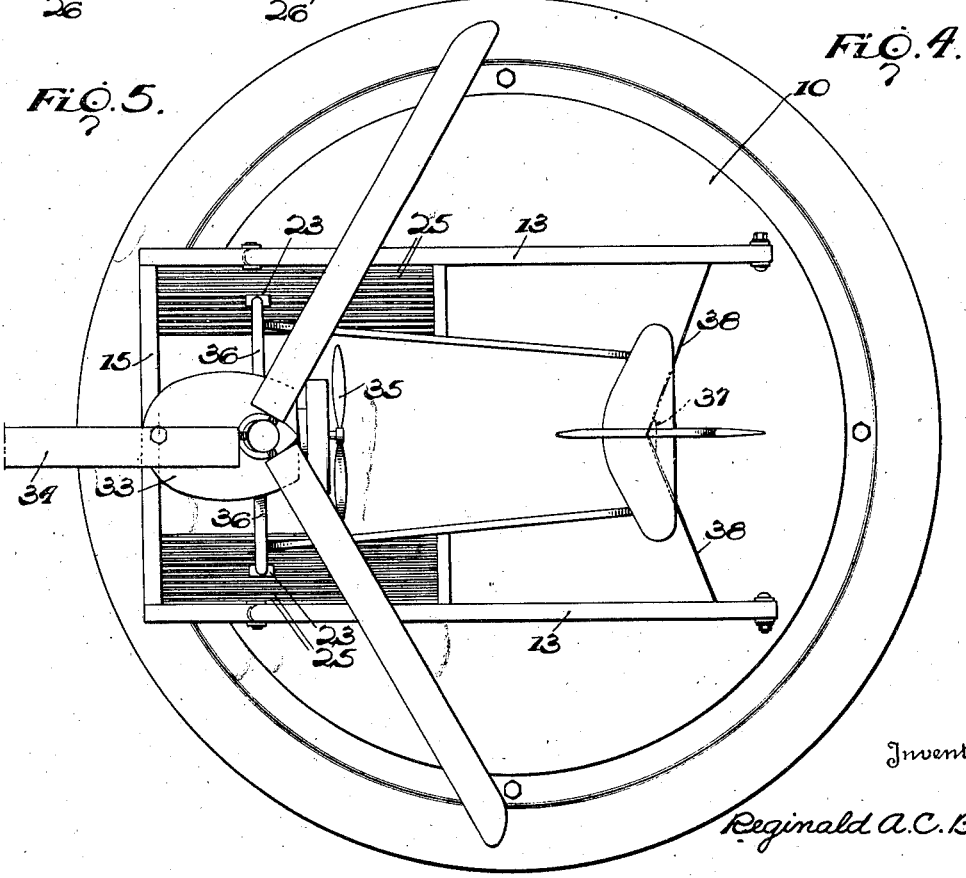

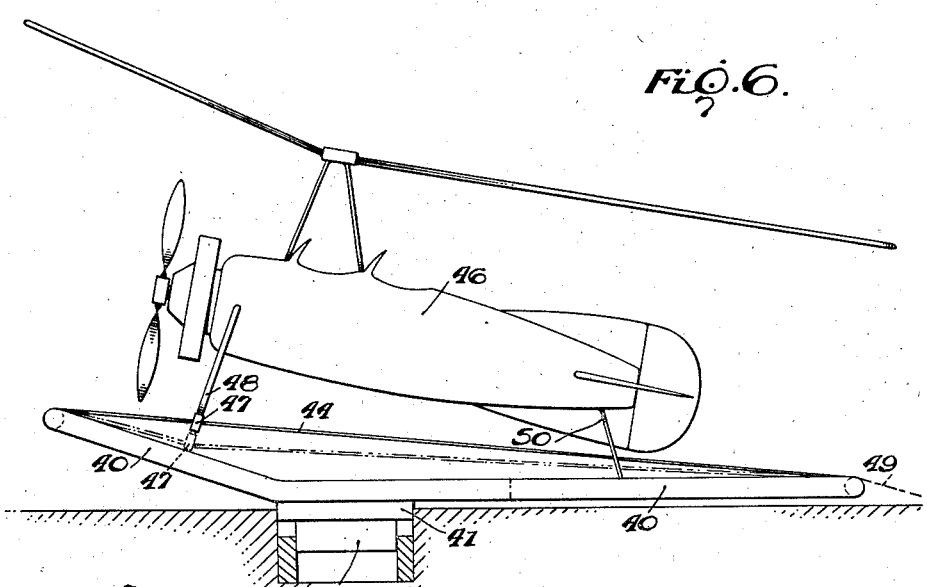
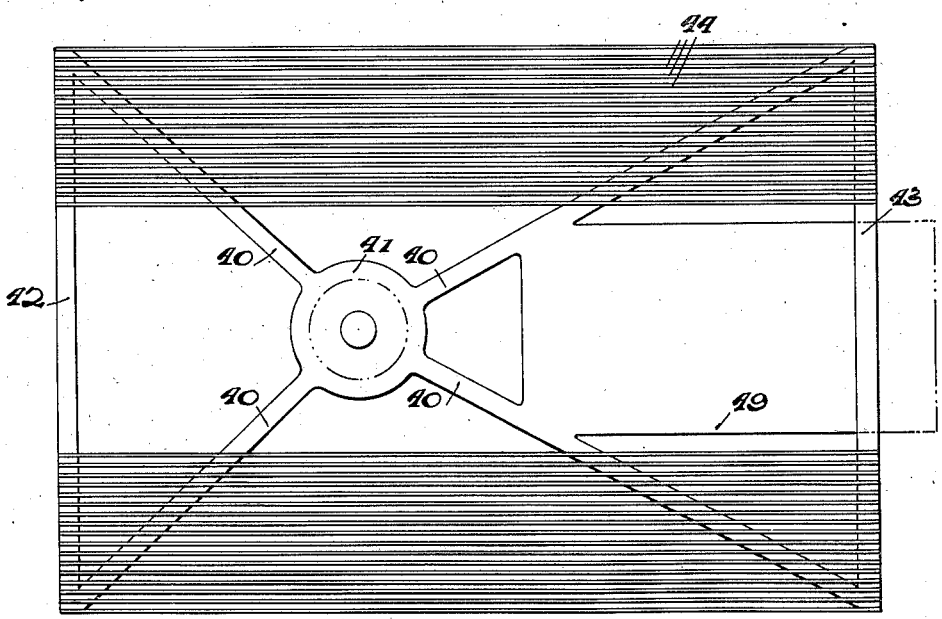

Feb. 4, 1947.  R. A. C. BRIE  2,415,071
LANDING AND LAUNCHING MEANS FOR AIRCRAFT
Filed Sept. 9, 1942  4 Sheets-Sheet 4

Inventor
Reginald A. C. Brie
Loyd Hall Sutton.
Attorney

Patented Feb. 4, 1947

2,415,071

UNITED STATES PATENT OFFICE 2,415,071

LANDING AND LAUNCHING MEANS FOR AIRCRAFT

Reginald A. C. Brie, Twickenham, England

Application September 9, 1942, Serial No. 457,798

15 Claims. (Cl. 244—115)

This invention relates to landing and launching means for aircraft which are capable of landing and of becoming air-borne at substantially zero forward speed, and is, therefore, particularly suitable for use with rotating wing aircraft.

In the operation of such aircraft from shipboard it has been proposed (see British Patent No. 469,554) to provide a resilient and shock-absorbing platform of relatively small size which can be swung horizontally over the side of the ship for landing and launching the aircraft, the axis of rotation of said platform being disposed eccentrically relative to its pivotal mounting. The present invention, on the other hand, is directed to the use of a platform of relatively small size incorporating shock absorbing, re-bound damping and anchorage means for the aircraft and rotatable concentrically relative to its pivotal mounting. It is intended primarily for use on small deck areas free from obstruction, such as are available or can readily be provided on normal merchant vessels, although it may also be used on land as on the roofs of buildings and in other cases where space is restricted. By a platform of relatively small size is meant one the plan form area of which is more or less comparable to that of the aircraft.

Operation from deck areas as described above makes essential the prevention of any movement of the aircraft after landing which might carry it beyond the limits of the landing area, particularly under conditions created by the rolling and/or pitching motion of the ship in a rough sea.

One of the objects of the invention is to facilitate operation under the above described conditions by the provision of an improved landing and launching platform, the frame of which may be inclined in the vertical plane at an angle corresponding to that of the longitudinal axis of the aircraft for whose use it is intended at its minimum speed in level flight.

In general it will be understood that when a heavier-than-air aircraft reduces its forward speed with no loss or gain in height, its tail tends to sink, thus inclining its longitudinal axis relative to the horizontal at a positive angle. The inclination of the frame of the platform in a comparable manner enables the aircraft to be landed upon it with greater accuracy and reduces the landing shock, a further advantage being that, as the platform may preferably be used by an aircraft with a very simple undercarriage, contact between the aircraft and the frame can be accomplished in a manner and attitude comparable to that when the aircraft makes a normal surface landing with a conventional undercarriage.

Another object is to provide automatic means cooperating with the aircraft to obtain immediate and secure anchorage of the latter to the frame of the platform on landing, but releasable when desired for launching.

A further object is to provide, in combination with a platform such as characterized above, shock absorbing means which absorb the aircraft's normal landing loads, thus enabling a much lighter and simpler undercarriage structure to be used, thereby increasing the load carrying capacity of the aircraft.

In a preferred form the platform comprises a rigid frame usually rectangular in plan form with its major axis determining the front and rear ends, said frame being upwardly inclined from its rear horizontally hinged and vertically adjustable end toward its front end where it is supported by suitable shock absorbing and re-bound damping means such as oleo type shock struts allowing movement in a vertical plane, the whole being rotatably mounted on a base to permit of orientation into the eye of the local relative wind. When ready to receive an aircraft, the plane of the frame of the platform is thus upwardly inclined from its rear end and the weight of the aircraft on landing causes the frame to swing downwardly about its rear hinge points owing to the compression of the shock absorbing means, so that its plane then approximates towards the horizontal; thus advantageously reducing the ground angle of the aircraft, and of its sustaining surfaces relative to the wind.

The platform as a whole may be mounted in any convenient position free from local obstructions above its own level and, as previously stated, it is preferably orientably mounted for bringing its major axis into the eye of the wind. Orientation may be achieved manually, mechanically, or aerodynamically, the latter by suitable fin area providing weathercock action which enables automatic and accurate orientation of the platform into the relative wind and, on board ship, its correct alignment to receive the aircraft independently of the direction in which the ship is moving relative to the natural wind.

In a preferred arrangement the frame is hinged at its rear end, and the shock absorbing supports near the front of the frame are attached thereto at points substantially vertically below a transverse line through the center of gravity position of the aircraft when at rest, the attachment of the top of each support to the frame and of the bottom of each support to the rotatable base being hinged to allow of movement in the fore and aft plane only.

The anchorage of the aircraft to the platform may be obtained by suitable engaging and locking means on the platform and aircraft which co-operate automatically on landing to anchor the aircraft to the platform. Broadly, these means comprise automatically locking hooks, catches or the like and co-operating engaging elements such as cables, rods, tubes, etc.

Either of these means may be fitted to the aircraft and the other to the platform; but in a preferred arrangement where the hook-on devices are fitted to the aircraft, a plurality of closely spaced cables are located within and parallel to the longitudinal axis of the frame of the platform, the longitudinal extent and plurality of such cables thus providing a degree of positional latitude to the aircraft prior to landing, and also permitting limited longitudinal movement of the aircraft in respect to the platform once engagement of the co-operating elements has been effected.

In an alternative arrangement the length of the cables may be disposed transversely to the longitudinal axis of the frame, their longitudinal extent thus being less than in the preferred arrangement described above, in which case a degree of positional latitude would still be provided for the aircraft prior to landing although any appreciable longitudinal movement thereafter would be precluded.

With either of these arrangements the individual cables engaged by the hooks shall be capable of absorbing the initial landing loads of the aircraft, transmitting them through the frame to the oleo struts, and of supporting the aircraft when at rest.

If on the other hand the hook-on devices are fitted to the platform, they may for example be located one on each of the longitudinal frame members and substantially above its point of attachment to an oleo strut, each hook being directed rearwardly horizontal or upwardly vertical, and being preferably arranged to co-operate each with one of the ends of a single co-operating engaging element fitted to the aircraft substantially beneath its center of gravity location and extending laterally relative thereto.

An alternative arrangement of the platform consists of a frame to locate the interengaging elements, supported by an underframe having supporting arms disposed radially from a centrally located cap which rests upon a shock absorbing strut located in a countersunk recess in the deck itself; such an arrangement being orientable and permitting the platform to be readily removed for stowage.

The nature of the invention, and its use in practice, will be more readily understood by reference to the following drawings showing several embodiments thereof, but it will be understood that these embodiments are by way of example only and that the drawings are not to be taken as a definition of the limits of the invention, reference being had to the appended claims for this purpose.

In the drawings,

Fig. 3 is a detail of a suitable hook-on device;

Fig. 4 is a plan view of another type of platform, with a helicopter thereon;

Fig. 5 is a plan view of a landing and launching platform with a pusher type Autogiro thereon;

Fig. 6 is a side view of another form of platform with a tractor Autogiro thereon;

Fig. 7 is a plan view of the platform shown in Fig. 6;

Figure 1:
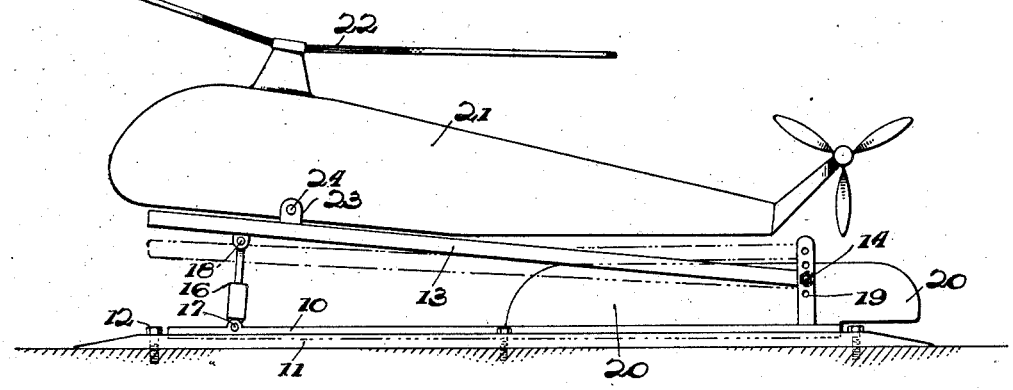
Fig. 1 is a side view of a landing and launching platform with a helicopter thereon.
Figure 2:
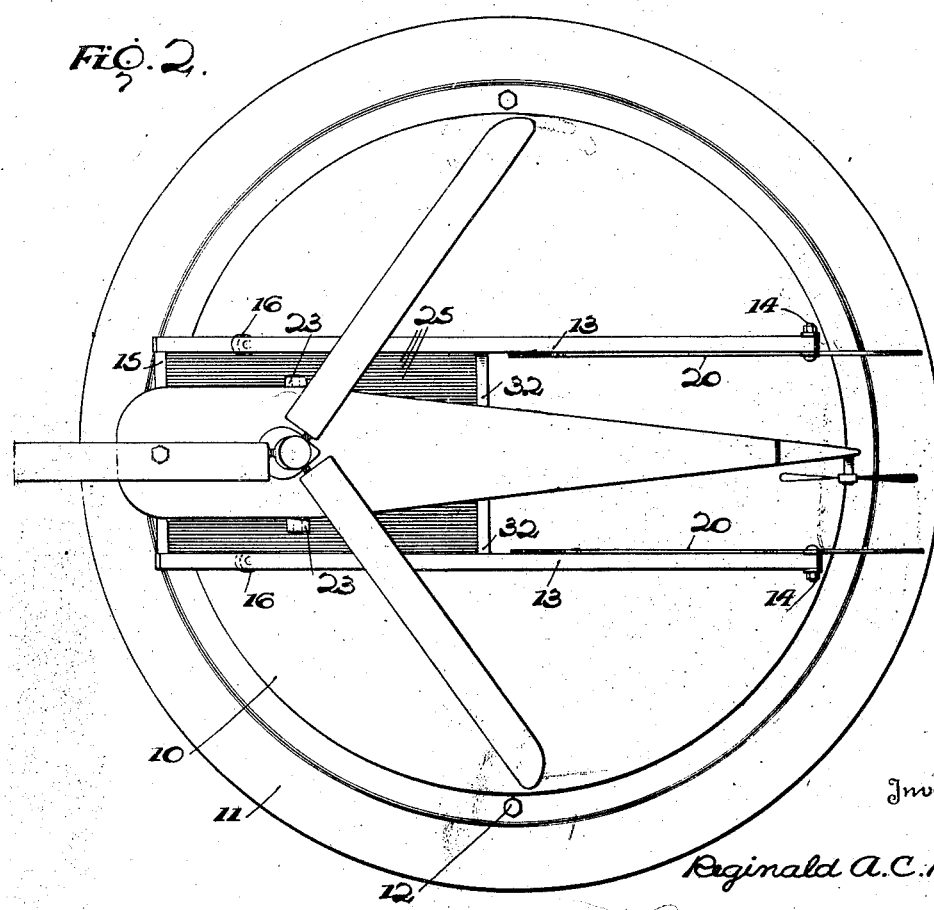
Fig. 2 is a plan view of Fig. 1.

Referring to Figs. 1 and 2, the platform is carried by a turntable base 10 which may be mounted for rotation about a vertical axis concentric therewith in any suitable manner. As shown, the base 10 rotates in a recess formed in a plate 11 which may, for example, be secured to the deck of a ship by means of bolts 12.

The frame of the platform comprises two parallel side members 13 each having one end pivoted in a bracket 14 carried by the turntable, the other ends of said members being suitably connected as by means of a transverse frame member 15 to form a frame hinged at its rear end on the turntable. As shown in Fig. 1, the frame is supported adjacent its front end by suitable shock absorbing means 16 which preferably comprises oleo struts, the lower ends of these struts being pivoted at 17 to the turntable 10 and the upper ends at 18 to the side frame members 13. Thus the platform is normally supported in an inclined position at an angle which preferably is approximately equal to that of the longitudinal axis of the aircraft relative to its line of flight at its minimum speed in level flight. The pivotal mounting of the rear end of the frame may be made adjustable vertically to adapt the inclination of the platform to the particular aircraft with which it is to be used, and to this end the brackets 14 may be provided with a series of vertically spaced holes 19 for the pivot pins of the side frame members 13.

When the aircraft alights, its weight causes the forward end of the platform to swing downwardly about the pivots 14, compressing the oleo struts 16 which absorb the kinetic energy due to landing of the aircraft. Thus a much simpler and lighter undercarriage structure can be used on the aircraft and its useful load carrying capacity is correspondingly increased.

The rotation of the turntable about its vertical concentric axis, either manually, mechanically or aerodynamically, enables orientation of the platform into the eye of the relative wind for landing or launching. Figs. 1 and 2 shows two fins 20 carried by the turntable whereby automatic orientation is secured by weathercock action.

The aircraft shown in these figures is a helicopter of known type having a fuselage 21 and a sustaining rotor 22. The usual landing wheels are, however, replaced by hook-on devices 23 carried at the ends of the axle 24 secured to the bottom of the fuselage and engaging co-operating supporting elements 25 on the platform. These hook-on devices may be of any suitable type, such as those disclosed in my co-pending application referred to above. For purposes of illustration, Fig. 3 shows one of these devices mounted on the end of the axle of the aircraft and engaging an element 25 carried by the platform as hereinafter described, whereby the aircraft is automatically anchored to the platform on landing. This hook-on device comprises guide arms 26 for guiding the element 25 into a recess 27, and a cam latch 28 pivoted at 29 on one of the arms and normally held in the position shown in Fig. 3 by means of a spring 30. As the element 25 enters the recess 27, it displaces the cam 28 about its pivot 29 and thereafter the cam is returned to normal position by the spring 30. The element 25 is thus locked in the recess 27, but when it is desired to launch the aircraft, the pilot pulls on the cable 31 to swing the cam again about its pivot, thus releasing the element 25.

It will be seen that since the aircraft is capable of landing at substantially zero forward speed, it can be located above the platform while still airborne and allowed to descend substantially vertically so that the hook-on devices 23 may automatically engage the elements 25 and anchor the aircraft to the platform. To facilitate this operation and to allow some degree of latitude for positional errors in the location of the aircraft, a plurality of spaced parallel elements 25 are preferably provided as shown in Fig. 2. These elements may comprise cables, rods, or the like extending longitudinally of the platform for any suitable distance and, as illustrated in Fig. 2, extending between the transverse frame member 15 and one or more transverse frame members 32. The space between the elements 25 need only be sufficient to permit the entry of the guide arms 26 between them, and it will be understood that they are preferably arranged in groups, one on the inner side of each frame member 13, the central part of the platform between these groups being open. In this way latitude is allowed in the position of the landing aircraft in a direction transverse to the platform, while in the longitudinal direction the entire length of the elements 25 is available for engagement by the hook-on devices 23 at any point. Also some forward or rearward movement of the aircraft may occur after it is anchored to the platform, the hook-on devices sliding on the supporting elements 25.

Fig. 4 illustrates a platform in which the elements 25 extend transversely instead of longitudinally, the hook-on devices 23 being turned through an angle of 90° from the position which they occupy in Figs. 1 and 2. The operation of this embodiment is the same as that described above, except that longitudinal movement of the aircraft after landing is permitted only by flexibility of the elements 25 whereas their entire length is available transversely of the platform to allow latitude for positional errors of the aircraft landing thereon.

Fig. 5 shows a turntable 10, frame 13, 15, and supporting elements 25 as in Figs. 1 and 2, which is adapted for use with a pusher type Autogiro 33 having a rotor 34 and propeller 35. With this type of aircraft the hook-on devices 23 may be carried at the ends of the struts 36 instead of the usual wheels. The open part of the platform between the groups of supporting elements 25 is preferably wide enough to accommodate the propeller 35, and latitude for positional errors of the landing aircraft is provided as described with reference to Figs. 1 and 2. Any excessive forward movement of the Autogiro on landing, which is permitted by sliding of the hook-on devices along the length of the elements 25, may be checked by a device at the tail end of the aircraft such as the tail skid 37 engaging an arresting wire 38.

Figs. 6 and 7 illustrate another type of frame comprising frame members 40 radiating from a central cap 41 and connected at their ends by transverse frame members 42 and 43 between which the cables 44 or other supporting elements extend, the desired inclination of the elements 44 being provided by arranging the frame members 42 and 43 at different heights. Cushioning of the normal landing load of the aircraft may be obtained by mounting the cap 41 on a suitable shock absorbing means 45 shown diagrammatically in Fig. 6, the platform sinking as a whole instead of swinging downwardly about one end as before.

Fig. 6 shows a tractor Autogiro 46 anchored to the elements 44 on the platform by hook-on devices 47 which may be similar to those shown in Fig. 3 and are carried at the ends of the struts 48. When flexible supporting elements such as cables are used, in this or in the other embodiments shown, they may yield under the load of the aircraft as shown in dotted lines in Fig. 6, thus in themselves cushioning the weight of the aircraft on landing. With this platform a lead-in plate 49 for the tail skid 50 may be used.

Figure 8:
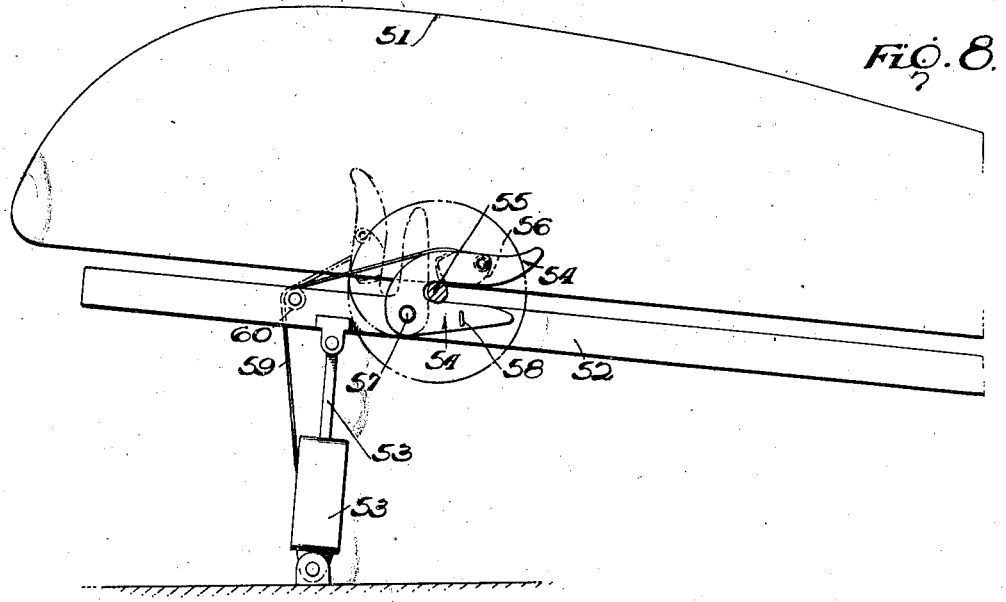
Fig. 8 is a side view of a further type of platform with a helicopter thereon.
Figure 9:
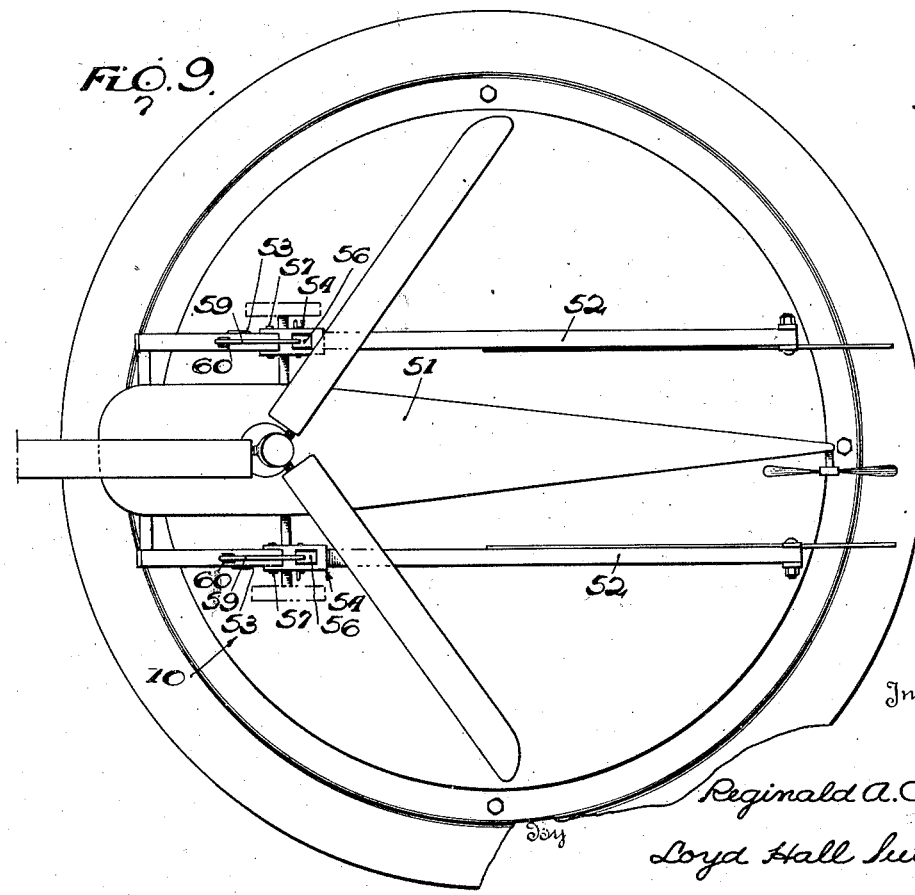
Fig. 9 is a plan view of Fig. 8.

Figs. 8 and 9 illustrate the use of a platform such as shown in Figs. 1 and 2 with hook-on devices carried by the platform and adapted to engage a bar or rod carried by the aircraft, here shown as a helicopter 51. The frame members 52 correspond to the frame members 13 of Fig. 1 and are similarly pivoted to the turntable and supported by oleo struts 53. The hook-on devices 54, which as shown are similar to the device shown in Fig. 3, are mounted one on each of the side frame members 52 and are normally directed rearwardly horizontal. The aircraft lands with its bar or axle 55 resting on the frame members 52 and moves forwardly to engage the bar in the hook-on devices. The cams 56, which are open in the elevated position of the frame assume the locked position as the weight of the aircraft depresses the frame.

To facilitate launching of the aircraft, the hook-on devices 54 may be pivoted to the frame members 52 at 57, so that they are capable of being swung upwardly to the dotted line position shown in Fig. 8. The hook-on devices may be locked in their normal position by means of pins 58, which are removed prior to launching so that the devices swing about their pivots 57 to the position shown in dotted lines as the aircraft rises. At the same time, the platform is also raised by the oleo struts, and advantage may be taken of this platform movement to release the cams 56 automatically. To this end cables 59 replace the cables 31 shown in Fig. 3 and extend over pulleys 60 to the lower members of the oleo struts. As the platform rises and the struts extend, these cables are tensioned to release the cam 56 automatically and to permit the aircraft to leave the platform.

It will be understood that the embodiments of the invention which have been described above are for purposes of illustration, and that changes may be made in the form, details of construction and arrangement of the parts without departing from the spirit of the invention. Reference should accordingly be had to the appended claims for a definition of the limits of the invention.

What is claimed is:

1. Landing and launching means for aircraft capable of landing and taking off at substantially zero forward speed comprising a frame the maximum dimension of which does not exceed substantially the maximum dimension of the aircraft landing thereon, means mounting said frame stationarily with respect to movement of the aircraft as it approaches and takes off from said frame and for orientation with respect to the relative wind about a vertical axis substantially concentric with said frame, a plurality of aircraft supporting elements on said frame each adapted for individual engagement with a cooperating element of the aircraft whereby said aircraft is supported on said frame, said cooperating element including anchoring means automatically operable by engagement with a supporting element as said cooperating element moves substantially vertically into supported position thereon to connect said elements and anchor the aircraft on said frame, said supporting elements being spaced from one another in one direction and each extending longitudinally in another direction relative to the direction of landing of said aircraft to allow lateral and longitudinal variations in the landing position of said aircraft, and means for yieldably mounting said supporting elements to cushion the landing load of the aircraft.

2. Landing and launching means for aircraft as defined in claim 1, said supporting elements being spaced laterally with respect to the direction of landing of said aircraft to allow lateral variations in the landing position and extending longitudinally with respect to said direction to allow longitudinal variation in the landing position.

3. Landing and launching means for aircraft as defined in claim 1, said supporting elements comprising a plurality of elements extending longitudinally with respect to the direction of landing of the aircraft, at least one element being disposed on each inner side of the frame and each element adapted to be engaged automatically by the movement into cooperative relationship thereto of hook-on means carried by the aircraft.

4. Landing and launching elements for aircraft as defined in claim 1, said supporting means comprising a plurality of spaced parallel elements extending transversely with respect to the direction of landing of the aircraft and adapted to be engaged automatically by the movement into cooperative relationship thereto of hook-on means carried by the aircraft.

5. Landing and launching means as defined in claim 1, said supporting elements and yieldable means comprising a plurality of cables individually yieldable under the landing load of the aircraft and adapted for individual automatic engagement with hook-on means carried by the aircraft.

6. Landing and launching means as defined in claim 1, said supporting elements and yieldable means comprising a plurality of cables extending longitudinally and spaced laterally with respect to the direction of landing of the aircraft, said cables being individually yieldable under the landing load of the aircraft and adapted for individual automatic engagement with hook-on means carried by the aircraft.

7. Landing and launching means as defined in claim 1, said supporting elements and yieldable means comprising a plurality of cables extending longitudinally and spaced laterally with respect to the direction of landing of the aircraft, said cables being individually yieldable under the landing load of the aircraft and adapted for individual automatic engagement with hook-on means carried by the aircraft, and shock absorbing means supporting said frame and yieldable to cushion the weight of the aircraft on landing.

8. Landing and launching means for aircraft capable of landing and taking off at substantially zero forward speed comprising a frame pivotally mounted at its rear about a horizontal axis, shock absorbing means normally supporting said frame in inclined position but yieldable to allow said frame to approach the horizontal under the weight of an aircraft landing thereon, means rotatably mounting said frame for orientation with respect to the relative wind, and anchoring means on said frame adapted for automatic engagement with cooperating elements of the aircraft on landing.

9. Landing and launching means for aircraft capable of landing and taking off at substantially zero forward speed comprising a turntable support orientable with respect to the relative wind, a frame with its rear end pivotally mounted and vertically adjustable on said support, shock absorbing means normally supporting said frame adjacent its front end in inclined position but yieldable to allow said frame to approach the horizontal under the weight of an aircraft landing thereon, and anchoring means on said frame adapted for automatic engagement with cooperating elements of the aircraft on landing.

10. Landing and launching means for aircraft capable of landing and taking off at substantially zero forward speed comprising a turntable support orientable with respect to the relative wind, a pair of frame members pivotally mounted on said turntable about a common horizontal axis and interconnected to form a frame hinged to said turntable at one end, shock absorbing means normally supporting said frame adjacent the other end in inclined position but yieldable to allow said frame to approach the horizontal under the weight of an aircraft landing thereon, and anchoring means on said frame adapted for automatic engagement with cooperating elements of the aircraft on landing, said anchoring means comprising a plurality of laterally spaced, longitudinal aircraft supporting elements on the inner side of and adjacent to each frame member.

11. Landing and launching means for aircraft capable of landing and taking off at substantially zero forward speed comprising a turntable support orientable with respect to the relative wind, frame members pivotally mounted on said turntable about a common horizontal axis and interconnected to form a frame hinged to said turntable at one end, shock absorbing means normally supporting said frame adjacent the other end in inclined position but yieldable to allow said frame to approach the horizontal under the weight of an aircraft landing thereon, and anchoring means on said frame adapted for automatic engagement with cooperating elements of the aircraft on landing, said anchoring means comprising hook-on devices mounted on said members at points on a line transverse to the longitudinal frame axis.

12. Landing and launching means for aircraft capable of landing and taking off at substantially zero forward speed comprising a frame the maximum dimension of which does not exceed substantially the maximum dimension of the aircraft landing thereon, said frame having a support rotatable for orientation with respect to the relative wind about a vertical axis within said frame, arms radiating from said support, a plurality of aircraft supporting elements carried by said arms in an inclined position to form an inclined landing platform, each of said elements adapted for automatic engagement with a cooperating element of the aircraft to support said aircraft and anchor it to said frame on landing, said supporting and anchoring elements being spaced from one another in one direction and each extending longitudinally in another direction relative to the direction of landing of said aircraft to allow lateral and longitudinal variations in the landing position of said aircraft, and means for yieldably mounting said supporting and anchoring elements to cushion the landing load of the aircraft.

13. Landing and launching means for aircraft capable of landing and taking off at substantially zero forward speed comprising a frame the maximum dimension of which does not exceed substantially the maximum dimension of the aircraft landing thereon, means mounting said frame stationarily with respect to movement of the aircraft as it approaches and takes off from said frame and for orientation with respect to the relative wind about a vertical axis within said frame, said frame including within its confines a plurality of aircraft supporting elements each adapted to be engaged by a cooperating element on the aircraft to support the latter as it reaches its position of rest on said frame, and anchoring means automatically operable by the relative movement of said elements as the aircraft reaches said position of rest to anchor the aircraft to said frame on landing, said supporting elements being spaced from one another in one direction and each extending longitudinally in another direction relative to the direction of landing of said aircraft to allow lateral and longitudinal variations in the landing position of said aircraft, and means for yieldably mounting said supporting elements to cushion the landing load of the aircraft.

14. Landing and launching means for aircraft as defined in claim 13, said anchoring means comprising hook-on devices mounted on the frame and disposed to engage automatically and hold said cooperating engaging element on the aircraft.

15. Landing and launching means for aircraft as claimed in claim 13, said anchoring means comprising a plurality of hook-on devices mounted on the frame at points on a line transverse to the direction of landing of the aircraft.

REGINALD A. C. BRIE.

REFERENCES CITED

The following references are of record in the file of this patent:

UNITED STATES PATENTS

| Number | Name | Date |
|---|---|---|
| 1,627,614 | McCully | May 10, 1927 |
| 1,739,193 | Ward | Dec. 10, 1929 |
| 2,135,033 | Courtney | Nov. 1, 1938 |
| 1,840,973 | Robb | Jan. 12, 1932 |
| 2,246,716 | Bottrill | June 24, 1941 |
| 1,085,000 | Amiss | Jan. 20, 1914 |

FOREIGN PATENTS

| Number | Country | Date |
|---|---|---|
| 20,753 | British | 1914 |
| 470,982 | British | Aug. 25, 1937 |
| 132,092 | British | Sept. 11, 1919 |
| 469,554 | British | 1937 |
| 262,228 | British | Dec. 9, 1926 |